J. W. FILBEY.
DAMPER FOR STOVEPIPES AND THE LIKE.
APPLICATION FILED APR. 10, 1917.

1,325,237.

Patented Dec. 16, 1919.

Inventor:
John W. Filbey
Ramsey and Parmelee,
Attys.

UNITED STATES PATENT OFFICE.

JOHN W. FILBEY, OF WRIGHTSVILLE, PENNSYLVANIA, ASSIGNOR TO WRIGHTSVILLE HARDWARE COMPANY, OF WRIGHTSVILLE, PENNSYLVANIA, A CORPORATION OF PENNSYLVANIA.

DAMPER FOR STOVEPIPES AND THE LIKE.

1,325,237.   Specification of Letters Patent.   Patented Dec. 16, 1919.

Application filed April 10, 1917. Serial No. 160,958.

*To all whom it may concern:*

Be it known that I, JOHN W. FILBEY, a citizen of the United States, and a resident of the city of Wrightsville, in the county of York, State of Pennsylvania, have invented certain new and useful Improvements in Dampers for Stovepipes and the like, of which the following is a specification.

This invention relates broadly to stoves and furnaces and more particularly to a damper for stove pipes and the like.

The principal object of this invention is a damper for stove pipes and the like constructed with a suitable damper plate supported upon a pointed pivot rod constructed to interlock with the damper plate and adaptable to be moved endwise for locking and unlocking; and wherein the entire pivot rod is cylindrical with the exception of a small portion constructed to comprise the interlock with the damper plate.

More specifically the present invention comprises improvements in the line of my prior patent No. 1,230,882, granted June 26, 1917.

Other and further objects of the present invention will in part be obvious and will in part be pointed out hereinafter in the specification following by reference to the accompanying drawings wherein like parts are designated by like characters throughout the several figures thereof.

Heretofore in the art various types of interlocking devices have been devised and constructed for the purpose of detachably interlocking a pivot rod with a damper plate. The most common form of these constructions has comprised pivot rods provided with projections extending outwardly from the rod, which projections necessitated providing an opening of sufficient size in the side wall of the stove pipe to pass the projection through. Also various interlocking openings and grooves have been provided in the pivot pin but such constructions require extremely accurate and careful molding in the foundry shop to provide an operative structure. In most cases such rods require more or less handwork to enable the rods to suitably interlock with the damper plates.

The present invention resides more particularly in the provision of an exceedingly simplified mechanism and wherein a minimum amount of hand labor is required both in producing the pivot rod and damper plate, and also in fitting these elements to properly interlock. The construction comprises more particularly a damper plate provided with a suitable minimum draft opening and formed with arches between which the pivot rod extends. The pivot rod is substantially cylindrical throughout its length with the exception of a small portion which is formed to interlock with a suitable opening in the damper plate and a compression spring is provided to retain the interlocked portions together and to constitute a friction brake adapted to hold the damper plate in various adjusted positions of rotation within the stove pipe.

Figure 1:
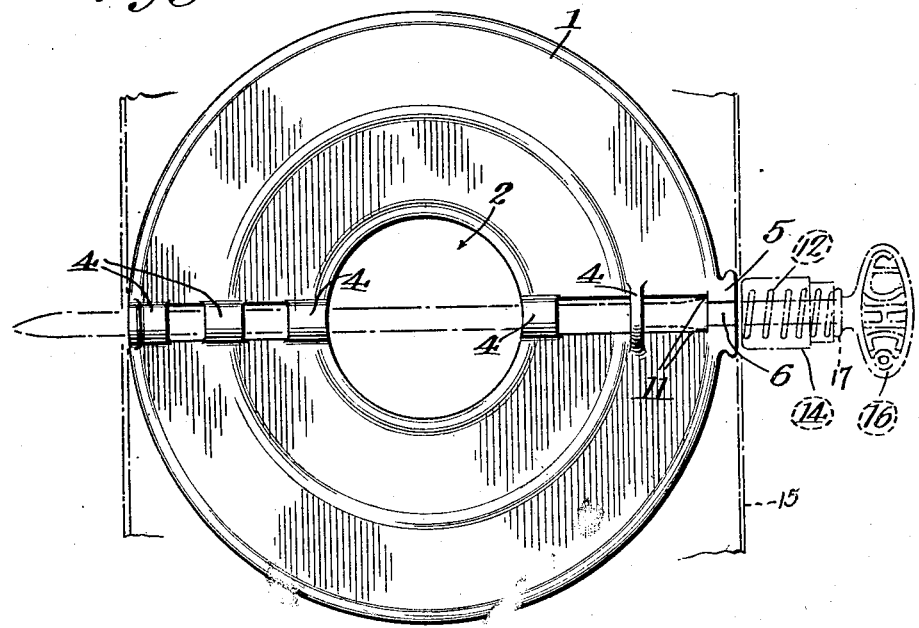
Figure 1 is a plan view illustrating one form of damper plate constructed in accordance with the present invention.
Figure 2:
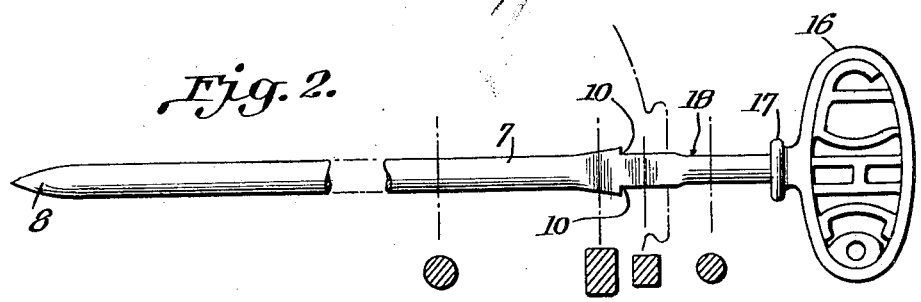
Fig. 2 is a view illustrating one form of pivot rod and showing cross-sections of the rod at various indicated positions.

Referring now to the drawings and more particularly to Figs. 1 and 2, the damper plate 1 is provided with a minimum draft opening which may constitute an opening 2 in the center of the plate or which may be otherwise disposed as desired. Preferably the draft plate is formed of oppositely disposed segments which are connected by means of keeper arches 4 that extend in opposite directions and are substantially semi-cylindrical thereby providing a pathway or passageway for the pivot rod. Preferably adjacent one edge of the damper plate 1, as at 5, the plate is thickened into a lug or marginal bearing member in which is provided an interlocking recess 6 of non-circular contour. This interlocking recess may be substantially square in contour and preferably has one side open, or it may be formed of other suitable cross-sections. The outer extremity of the marginal bearing member, or lug, forms a bearing for operative engagement with the inner wall of a stove pipe, as illustrated in Fig. 1.

In Fig. 2 is illustrated one form of pivot rod 7 which comprises a substantially cylindrical shaft that preferably is pointed, as at 8, and which is provided with a squared portion 9 that is adapted to exactly fit and lock within the interlocking recess 6. A pair of stop walls 10 may be provided and when the squared portion 9 is within the interlocking recess 6 the stop walls 10 are adapted to abut against similar coördinating stop walls 11 on the damper plate. Beyond the squared portion 9 the pivot rod is again cylindrical in cross-section. When the pivot rod is to be placed through and to interlock with the damper plate it is preferably threaded through a compression spring 12 which may or may not be mounted within a suitable housing 14 and the rod is passed through a suitable opening in the stove pipe 15 and then threaded through the keeper arches 4 and out through the opposite wall of the said stove pipe. The pin is turned with the plane of the handle 16 at substantially right angles to the plane of the damper plate 1 and the continued inward movement compresses the spring 12 between the stove pipe 15 and the shoulder 17 until the round portion 18 upon the pivot rods lies within the interlocking recess 6 at which time the pivot rod is rotated through ninety degrees and pressure released thereon so that the spring reacting draws the squared portion 9 into the interlocking recess and the stop walls 7 on the pin against the stop walls 11 on damper plate.

Figure 3:
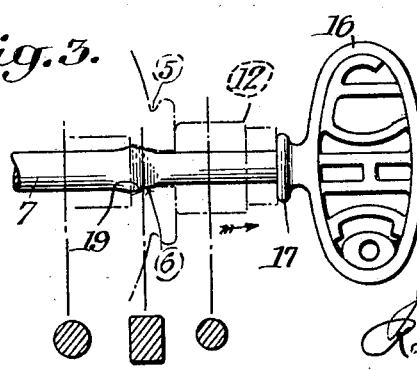
Fig. 3 is a detail view illustrating a different form of the invention and likewise showing cross-sections of the pivot rod at indicated positions.

The construction disclosed in Fig. 3 is substantially identical with the construction previously disclosed with the exception that the locking recess in the damper plate is provided with inclined walls and the interlocking portion on the pivot pin is provided with a wedge-shaped section 19 to fit within the inclined walled recess so that the action of the spring 12 tightly draws the wedge section 19 into the inclined walled recess when the pin is manipulated as above specified and pressure thereon released to enable the coiled spring to react in the manner above set forth.

Having thus described my invention what I claim is:

1. As an article of manufacture, a damper comprising a damper pin having a circular shank portion, a non-circular shank portion, and a stop portion adjacent the latter, in combination with a damper plate formed with a diametrical passageway for the reception of the pin and with a marginal lug at the end of said passageway, said marginal lug having its outer extremity forming a bearing for engagement with a pipe, its inner extremity forming a bearing for engagement with the stop portion of the pin, and a portion intermediate said extremities formed for engagement with the non-circular portion of the pin to prevent rotation thereof, and yielding pressure means for retaining the non-circular portion of the pin removably in engagement with said intermediate portion of the lug.

2. As an article of manufacture, a damper comprising a damper pin formed with a circular shank portion, a non-circular shank portion, and a stop portion in juxtaposition, in combination with a damper plate formed with a passageway for the reception of the pin and with a marginal lug at the end of said passageway, the outer portion of said lug forming a bearing for engagement with a pipe, and the inner portion of said lug formed for engagement with the stop portion of the pin to prevent the withdrawal thereof, said lug having converging walls intermediate said inner and outer portions adapted for engagement with the non-circular portion of the pin to hold the same against rotation relative to the plate, and yielding pressure means effective to maintain the pin and plate removably in coöperative engagement.

JOHN W. FILBEY.